US006576289B2

(12) United States Patent
Sosebee et al.

(10) Patent No.: US 6,576,289 B2
(45) Date of Patent: Jun. 10, 2003

(54) METHOD AND COMPOSITION FOR TREATING VOLATILE WASTE

(76) Inventors: Ernest Jeffrey Sosebee, 3503 Stockton Dr., Mt. Pleasant, SC (US) 29466; William Walter Strause, 863 Joe Rivers Rd., Charleston, SC (US) 29412

( * ) Notice: Subject to any disclaimer, the term of this patent is extended or adjusted under 35 U.S.C. 154(b) by 0 days.

(21) Appl. No.: 09/764,786

(22) Filed: Jan. 17, 2001

(65) Prior Publication Data

US 2002/0093010 A1 Jul. 18, 2002

(51) Int. Cl.$^7$ .............................. B05D 1/00; B05D 1/40; B05D 7/06; A62D 3/00; C09K 21/02; C09K 21/04

(52) U.S. Cl. ............... 427/180; 427/207.1; 427/242; 427/287; 427/288; 427/291; 427/427; 588/249; 588/251; 588/252; 252/601; 252/607; 252/608; 252/609; 252/610

(58) Field of Search ................. 252/601, 607, 252/608, 609, 610, 611; 588/249, 251, 252; 427/180, 189, 207.1, 242, 287, 288, 291, 427

(56) References Cited

U.S. PATENT DOCUMENTS

| 3,840,388 A | * | 10/1974 | Perlus et al. | 117/59 |
| 3,935,343 A | * | 1/1976 | Nuttall | 427/353 |
| 4,182,681 A | * | 1/1980 | Gumbert | 252/8.1 |
| 4,184,969 A | * | 1/1980 | Bhat | 252/8.1 |
| 4,224,169 A | * | 9/1980 | Retana | 252/8.1 |
| 4,247,332 A | * | 1/1981 | Kinoshita et al. | 106/18.16 |
| 4,272,414 A | * | 6/1981 | Vandersall | 252/602 |
| 4,342,669 A | * | 8/1982 | Wilson et al. | 252/602 |
| 4,438,028 A | * | 3/1984 | Schmittmann et al. | 252/609 |
| 4,468,495 A | * | 8/1984 | Pearson | 525/158 |
| 4,539,045 A | * | 9/1985 | Wagner | 106/18.13 |
| 4,552,803 A | * | 11/1985 | Pearson | 428/262 |
| 4,606,831 A | * | 8/1986 | Kegeler et al. | 252/7 |
| 4,842,611 A | * | 6/1989 | Huffman | 8/188 |
| 5,062,996 A | * | 11/1991 | Kaylor | 252/610 |
| 5,076,969 A | * | 12/1991 | Fox | 252/601 |
| 5,184,780 A | * | 2/1993 | Wiens | 241/19 |
| 5,342,656 A | * | 8/1994 | Valso | 427/394 |
| 5,391,246 A | * | 2/1995 | Stephens | 156/71 |
| 5,397,509 A | * | 3/1995 | Kostrzecha | 252/607 |
| 5,422,330 A | * | 6/1995 | Kaylor | 502/402 |
| 5,683,820 A | * | 11/1997 | Fuller et al. | 428/514 |
| 5,855,664 A | * | 1/1999 | Bielecki et al. | 106/697 |
| 6,162,375 A | * | 12/2000 | Crouch et al. | 252/603 |

* cited by examiner

*Primary Examiner*—Joseph D. Anthony
(74) *Attorney, Agent, or Firm*—Dority & Manning, PA

(57) ABSTRACT

A process of treating solid material flammable waste is provided in which dry fire retardant admixtures are used to intermix with the material waste so as to lower the burn rate and flammability characteristics of the material waste. The process, in turn, allows the waste to be accepted by an approved waste handling facility.

7 Claims, No Drawings

METHOD AND COMPOSITION FOR TREATING VOLATILE WASTE

FIELD OF THE INVENTION

This invention is directed towards a process of treating hazardous solid-waste materials to decrease the flammability and reduce the burn rate of the materials.

BACKGROUND OF THE INVENTION

Certain types of solid hazardous waste materials must meet stringent criteria before they will be accepted for disposal by an approved waste disposal company. One such test, which conforms to Method 1030 of the United States Environmental Protection Agency, and which is incorporated herein by reference, sets forth evaluation methods for determining the ignitability of solid waste including pastes, granular materials, and powdery substances. The testing protocols provide for obtaining strips or material trains of the hazardous material and exposing them to a combustion source. Materials that propagate burning along a 200 mm strip or more within a specified time period are then subject to additional evaluation under a burning rate test as set forth in section 7.2 of EPA Method 1030. Materials which exceed an established burn rate are unsuitable for acceptance. Consequently, the entire shipment of hazardous waste from which the samples is taken are rejected.

If the waste is rejected, there is additional cost in the handling and transport of the waste to the waste originator or to another facility. Alternate facilities typically charge a higher disposal fee based upon the enhanced flammability of the material. Accordingly, there is a need for a process that may be used to treat hazardous waste so as to render the waste material less flammable.

SUMMARY OF THE INVENTION

It is one aspect of the present invention to provide a dry chemical mixture which may be intermixed with hazardous materials prior to delivery of the hazardous materials for evaluation and disposal. The mixture of dry chemicals act as a fire retardant and lowers the flammability of the materials as evidenced by improved ability to pass a burn progression test.

The process not only facilitates acceptance of the hazardous waste by a waste disposal company, but brings about attendant improvements in the storage, handling, and transport of the treated hazardous material.

Further, the treatment process lends itself to use by the intended waste receiving recipient such that it is possible to now treat a material waste having too high of a flammability property at the waste facility location. Following treatment, subsequent evaluations will establish that the waste may now be accepted by the facility, thereby saving the expense and trouble of returning the waste material to the originator.

These and other features, aspects, and advantages of the present invention will become better understood with reference to the following description.

DESCRIPTION OF THE PREFERRED EMBODIMENT

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features, and aspects of the present invention are disclosed in, or are obvious from, the following detailed description. It is to be understood by one of ordinary skill in the art that the present discussion is a description of exemplary embodiments only and is not intended as limiting the broader aspects of the present invention, which broader aspects are embodied in the exemplary constructions.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the application. In addition, it should be understood that aspects of the various embodiments may be interchanged, both in whole or in part. Therefore, the spirit and scope of the invention should not be limited solely to the description of the preferred versions contained therein.

As used herein, the term "hazardous materials" includes (but is not limited to) combustible solids and flammable solids as defined by the U.S. Department of Transportation as set forth in 49 CRF 173.124 (subpart D) which is incorporated herein by reference.

In accordance with this invention, it has been found that selected dry chemicals may be used to treat hazardous materials. Preferably, the chemical mixture is added to the hazardous materials prior to being loaded for transport to a disposal facility. The chemical mixtures are found to serve as a fire retardant which reduces the burn rate of the hazardous materials when subjected to standard burn progression tests.

As a result, the chemical mixture and application process allows more diverse types of waste to be accepted by a waste disposal facility. Further, by reducing the flammability of the hazardous waste, the storage, shipment, and/or disposal of the waste material is made safer.

In addition, the present invention also offers safer storage of organic contaminated waste materials such as contaminated debris which may include rags, filters, rubber, cotton, nylon, paper, wood, and paint debris. The treatment process provides for a safer storage, disposal, and transportation of combustible hazardous materials.

The efficiency of the treatment process has been demonstrated on several examples upon material waste, such as solvent-containing rags, which had initially failed a burn rate test. Upon application of the chemical mixture as set forth below, the same shipment of hazardous materials would pass the burn rate test and thereafter be acceptable for receipt by the waste disposal facility.

A variety of dry chemicals have been found useful with respect to the present invention. While the use of an individual dry chemical retardant selected from the list below may be operative, it is preferred that mixtures of two or more of the dry chemicals be used to treat the hazardous material.

Dry chemical admixtures found useful in the present invention include: monoammonium phosphate, ammonium sulfate, magnesium aluminum silicate, methyl hydrogen siloxane, barium sulfate, sodium bicarbonate, and potassium bicarbonate. It has been found that mixtures of three or more of these dry chemicals provides a useful admixture for treating hazardous waste. Additional dry chemicals useful for this invention would also include fire retardants and solid extinguishing agents commonly used in pressurized fire extinguishers.

In accordance with this invention, it has been found that solid material contaminated with certain hazardous and flammable materials may be effectively treated using the retardants and process set forth herein. The retardant admixture is found to be effective in treating materials contaminated with acetone, benzene, butane, butylamine, cyclohexane, ethyl benzene, ethyl acrylate, ethanol, isobutenyl ketone, methyl ketone, methyl methacrylate, methanol, methyl acrylate, naphthalene, O-dichlorobenzene, P-dichlorobenzene, phenols, toluene, trichloroethylene, vinyl toluene, xylene, tetrachloroethane, and, lacquer dust. However, the above list is not believed limiting in that other flammable hazardous constituents may be treated by the present protocols.

The following examples set forth useful protocols and procedures for applying the dry chemical admixture to hazardous waste material so as to render the waste material less flammable. It is understood and appreciated that the following examples establish the usefulness and utility of the present invention though variations and relative concentrations of admixtures, types of various admixtures, the coating and/or treatment protocol, may be all be varied depending upon available resources and the characteristic of the hazardous material to be treated.

EXAMPLE 1

A 50 cubic yard trailer load of hazardous material including mixtures of solvent rags, paper, and other contaminated debris is mixed with a fire retardant comprising equal weight amounts of monoammonium phosphate and magnesium aluminum silicate powders. The retardant is mixed in with the debris at a rate of 20 pounds per cubic yard of hazardous material, the mixing designed to coat the retardant onto the hazardous waste material. The mechanical mixing is carried out by a front-end loader. Once the hazardous material has been uniformly coated with the retardant, the hazardous material is returned to the original storage trailer container.

Subsequent evaluations according to the burn rate test set forth in EPA Method 1030 were conducted to confirm that the treated hazardous material passes the burn rate test set forth above. Control samples of untreated hazardous material are unable to pass the burn rate test.

Depending upon the volume of waste material, the type of hazardous material, the storage and shipping facilities available, as well as available equipment, a variety of mechanical mixing protocols may be used. For instance, a rotary mechanical mixer may be used to coat the hazardous material with the flame retardant material. For small volumes, workers may use shovels to manually mix the retardant with the hazardous material. The retardant mixing may also be used in conjunction with a hazardous material shredding process, a grinding process, or any other mechanical mixing apparatus or protocol so as to achieve a thorough intermixing of the retardant with the hazardous material. Additionally, mixing may be accomplished by using a rotary tumbler to mix the admixture with the waste material, a compressed air dispersement of the dry admixture onto a target surface of the waste material as well as applying an aqueous or other fluid slurry of the chemical reagents. Such a slurry may be easier to apply to certain materials and, upon drying, provides a surface application of the admixture to the material waste. Alternatively, the waste material may be moistened first to increase the adhesion of the dry admixture thereto. Again, upon drying, the admixture is coated onto the solid waste material.

It is also envisioned that an inert powdered dye or other colorant may be added to the admixture. The colorant provides several advantages. One, the colorant assists in determining when adequate coating of the hazardous waste has occurred. Secondly, the colorant helps identify batches of hazardous waste which have been treated and are therefore safe for subsequent transport, storage, or disposal.

These and other modifications and variations to the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention.

In the claims:

1. The process of lowering the burn rate of a solid hazardous material comprising the steps of:

providing a supply of a combustible and/or flammable solid material, the solid material additionally containing an organic flammable hazardous contaminant adsorbed and/or absorbed thereon; and coating said combustible and/or flammable solid material containing an organic flammable hazardous contaminant adsorbed and/or absorbed thereon with an effective amount of a dry fire retardant, wherein the dry fire retardant treated combustible and/or flammable solid material containing an organic flammable hazardous contaminant adsorbed and/or absorbed thereon has a sufficiently lower burn rate that it is acceptable for receipt by a solid hazardous waste disposal facility.

2. The process according to claim 1 wherein said solid material is selected from the group consisting of resins, polymers, rags, filters, rubber, cotton, nylon, metal, paper, wood, powders, paint debris, and combinations thereof.

3. The process according to claim 1 wherein the fire retardant is selected from the group consisting of monoammonium phosphate, ammonium sulfate, magnesium aluminum silicate, methyl hydrogen siloxane, barium sulfate, sodium bicarbonate, potassium bicarbonate, and mixtures thereof.

4. The process according to claim 1 wherein said step of coating the solid material includes mechanically mixing the solid material with the fire retardant.

5. The process according to claim 1 wherein the said fire retardant further comprises a dye or colorant.

6. The process of treating a solid hazardous material having a high burn rate comprising the steps of:

providing a supply of a combustible and/or flammable solid material, the solid material additionally containing an organic flammable hazardous contaminant adsorbed and/or absorbed thereon; and mixing said combustible and/or flammable solid material containing an organic flammable hazardous contaminant adsorbed and/or absorbed thereon with an effective amount of a dry fire retardant, the dry fire retardant being selected from the group consisting of monoammonium phosphate, ammonium sulfate, magnesium aluminum silicate, methyl hydrogen siloxane, barium sulfate, sodium bicarbonate, potassium bicarbonate and mixtures thereof, wherein the dry fire retardant treated combustible and/or flammable solid material containing an organic flammable hazardous contaminant adsorbed and/or absorbed thereon has a sufficiently lower burn rate that it is acceptable for receipt by a solid hazardous waste disposal facility.

7. The process of treating a solid hazardous material having a high burn rate comprising the steps of:

providing a supply of combustible and/or flammable solid materials, said solid materials additionally containing an organic flammable hazardous contaminant adsorbed and/or absorbed thereon; said organic flammable hazardous contaminant selected from the group consisting of acetone, benzene, butane, butylamine, cyclohexane, ethyl benzene, ethyl acrylate, ethanol, isobutenyl ketone, methyl ketone, methyl methacrylate, methanol, methyl acrylate, naphthalene, O-dichlorobenzene, P-dichlorobenzene, phenols, toluene, trichloroethylene, vinyl toluene, xylene, tetrachloroethane, lacquer dust, and combinations thereof, and, mixing with said combustible and/or flammable solid materials containing an organic flammable hazardous contaminant adsorbed and/or absorbed thereon an effective amount of a dry fire retardant, the dry fire retardant being selected from the group consisting of monoammonium phosphate, ammonium sulfate, magnesium aluminum silicate, methyl hydrogen siloxane, barium sulfate, sodium bicarbonate, potassium bicarbonate and mixtures thereof;

wherein the dry fire retardant treated combustible and/or flammable solid materials containing an organic flammable hazardous contaminant adsorbed and/or absorbed thereon have a sufficiently lower burn rate that they are acceptable for receipt by a solid hazardous waste disposal facility.

* * * * *